United States Patent [19]

Ernest

[11] 3,981,276

[45] Sept. 21, 1976

[54] INDUCTION-EXHAUST SYSTEM FOR A ROTARY ENGINE

[75] Inventor: Robert P. Ernest, Dearborn Heights, Mich.

[73] Assignee: Ford Motor Company, Dearborn, Mich.

[22] Filed: June 6, 1974

[21] Appl. No.: 476,833

[52] U.S. Cl. .............................. 123/8.45; 123/8.13; 60/320; 137/512.15; 137/856

[51] Int. Cl.[2] ............................ F02B 53/00

[58] Field of Search ................ 123/8.45, 8.09, 8.05, 123/8.13, 8.01; 60/901, 320; 137/512.15, 525.3

[56] References Cited

UNITED STATES PATENTS

| | | | |
|---|---|---|---|
| 1,672,436 | 6/1928 | Thege | 137/525.3 |
| 2,505,757 | 5/1950 | Dunbar | 137/512.15 X |
| 2,782,777 | 2/1957 | Jasper | 137/512.15 X |
| 3,347,213 | 10/1967 | Froede | 123/8.45 |
| 3,514,235 | 5/1970 | Yamauchi | 123/8.45 UX |
| 3,786,833 | 1/1974 | Frenkel | 137/512.15 |
| 3,809,019 | 5/1974 | Stoltman | 60/901 |
| 3,817,220 | 6/1974 | Brumm | 123/8.05 |
| 3,844,256 | 10/1974 | Ishikawa | 123/8.45 |

FOREIGN PATENTS OR APPLICATIONS

| | | | |
|---|---|---|---|
| 456,430 | 6/1913 | France | 137/512.15 |

*Primary Examiner*—Clarence R. Gordon
*Attorney, Agent, or Firm*—Joseph W. Malleck; Keith L. Zerschling

[57] ABSTRACT

An induction and exhaust system for a rotary engine is disclosed which has a wing-type reed valve assembly disposed in the intake port of said system and effective to respond instantaneously to a back-flow differential pressure for closing the intake port; the assembly is capable of cycling at least 120 times/second. The system substantially eliminates various types of dilution and variance of the inducted mixture enabling a high velocity peripherally ported engine to deliver an improved low end engine torque characteristic and improved overall fuel economy for a passenger automotive vehicle.

Various types of wing reed valve constructions are illustrated, the preferred mode having 16 reed valves arranged with the trailing edge of the assembly cage aligned with the exit of the intake port; the center line of the intake port is located substantially at theoretical zero pressure difference between the adjacent chambers defined by the rotor and housing. A multiple-staged carburetor increases road load induction velocities and the induction air fuel mixture is heated by the exhaust system in a controllable manner through the use of a modulating flapper valve disposed in a heat transfer section.

14 Claims, 17 Drawing Figures

INDUCTION-EXHAUST SYSTEM FOR A ROTARY ENGINE

BACKGROUND OF THE INVENTION

All rotary internal combustion engines require some means by which a combustible mixture is inducted into variable volume chambers defined between the rotor and the surrounding housing. However, in a rotary engine, the induction system requires a design approach which is considerably different than that for a reciprocating engine. The rotor and its sealing mechanism operates as a valving mechanism for separating the intake and exhaust modes of a ported system where, in contrast, all four cycle reciprocating engines require extended and well timed auxiliary apparatus. Therefore, this invention shall be discussed in reference to a ported rotary engine and numerous essential problems that must all be overcome to provide a satisfactory induction exhaust system.

PORT OVERLAP

Although rotary internal combustion engines have become commercial and highly utilitarian, certain problems of the induction system still persist. One of these is the likelihood for exhaust gases to dilute the incoming mixture. By definition, exhaust dilution in any engine, including a reciprocating engine, occurs when the induction system and the exhaust system are momentarily connected and the pressure in the exhaust system is greater than the pressure in the induction system. In a reciprocating engine, one aspect of this phenomenon is called valve overlap, and is best called port overlap in a rotary engine. The quantity of exhaust gas dilution flowing back into the induction system varies directly with the amount of port overlap and the level of exhaust gas pressure. In a ported rotary engine, the aspect of port overlap occurs when the intake and exhaust ports are momentarily interconnected. This interconnection can occur with the three generally accepted generic types of ported rotary engines: peripheral inlet ports, side inlet ports, or a combination of a side inlet and a peripheral inlet port. In a side inlet port engine, this condition can be minimized by designing the inlet port shape so that the triangulated rotor covers the inlet port during substantially all of the critical period of overlap. However, this places a limitation on location of the inlet port which results in an inherently short intake event (always less than 360° of eccentric shaft rotation). The short intake event, when combined with the increased back pressure of the side ported system (caused by the tortous path) produces undesirably bad low end engine torque. In a peripheral ported engine, this overlap condition cannot be eliminated satisfactorily by use of presently known technology to improve low end engine torque.

If port overlap cannot readily be minimized without a noticeable drop in power output, why is it necessarily detrimental? Rotary engines with high port overlap and/or high exhaust gas pressure will have a greater quantity of dilution. High levels of dilution reduce the power output since less oxygen is present in the final charge. While this is not desirable, the greatest disadvantage of high levels of exhaust dilution is the three-way detrimental effect on fuel economy. First, when high levels of exhaust gas dilution cause a greater than average power loss, engine fluid friction becomes a greater percentage of the total indicated power. It, therefore, results in a higher percentage of fuel for the brake output available and fuel economy is lower. Secondly, increased exhaust gas dilution in the fuel/air charge requires a higher percentage of fuel for a satisfactory burnable mixture. This also results in lower fuel economy. Thirdly, there is a detrimental effect on fuel economy from high levels of exhaust gas dilution as a result of a lower combustion flame speed. Exhaust gas dilution reduces flame speed and lowers the combustion rate of pressure rise. This requires increased spark advance for best power. Increased spark advance causes a slight increase in negative work during the compression stroke, which as said, results in lower fuel economy. If the spark advance is not increased, the mixture burns later during the expansion stroke, which results in lower thermal efficiency and thus poor fuel economy.

INTERCHAMBER COMMUNICATION

No interchamber communication can usually occur in a side inlet port engine, but in a peripherally ported engine; this has continued to be an insurmountable problem. Variable volume chambers are defined by the epitrochoid cavity and rotor. If the rotor is triangulated, there will typically be three such chambers separated by the apex seal assemblies. Since sealing is usually accomplished as a line contact by the apex seal against the trochoid wall, such seal is lost when an apex assembly traverses the much larger dimension of a peripheral port. Depending on the design of the engine, dilution can occur by high pressure exhaust gases moving into a downstream chamber while the exhaust event is not complete, thereby to dilute the combustible mixture. Dilution may also occur even though the exhaust event has been completed; such dilution will take place by loss of the predetermined mixture from one chamber to an upstream chamber; in this latter sense, interchamber communication differs from port overlap, but has an equally detrimental and serious effect on engine performance.

COMPRESSION SPITBACK

A significant but slightly different aspect of the dilution problem that occurs with ported rotary engines is that best characterized as "spitback" or reverse carburetor flow. This phenomenon results when the inlet port is closed at a point in time too late during the compression stroke to prevent back-flow into the suction or induction stage and eventually into the carburetor inlet. In a sense, the back-flow forced back through the carburetor causes air and fuel to "spitback" resulting in misfiring, reduced power, increased fuel consumption, and unacceptable induction noise.

This problem is usually not present in a side inlet port because the inlet is always closed before significant compression as mandated by the restricted choices of locating the inlet port.

INADEQUATE FLOW VELOCITY AND TURBULENCE

Another problem is that presented by the inherently longer compression stroke of a rotary engine and particularly a peripherally ported engine. This is due to the geared relationship of the rotor to the eccentric shaft, which requires 135° of eccentric shaft motion to uncover approximately ½ of a variable volume chamber. The average reciprocating engine requires only 80° of crankshaft rotation to travel ½ of its stroke. Because of this time difference, the rotary engine rotor generates very little charge mixture turbulence by its motion which eventually results in lower combustion flame speed at the start of combustion. This effect appears in known or conventional low velocity peripheral ported systems, and also in low velocity side inlet port induction systems, such as that exhibited by commercial rotary engines to date. The latter exhibits this poor-flame speed phenomena resulting in loss of low end torque, low end fuel economy and high emission levels. Attempts by the prior art to vary the combustion chamber shape have not resulted in an increase in this turbulence because any effectiveness of the chamber shape occurs too late in the cycle to be effective.

DESIRED SOLUTION

Although the port overlap dilution problem and the spitback problem can occur in all ported rotary engines, these problems will be more severe in all prior art peripheral inlet ported engines. For this reason, commercial rotary engines have been of the side inlet port type. However, the peripherally ported engine can offer a noticeable advantage when attempting to solve the longer compression problem, if the inlet port is sized to give high inlet velocities. But some means must be found to overcome the severity of port overlap, spitback, and interchamber communication which presently makes such a design a poor choice. The port timing in a peripheral inlet ported engine has an evident longer event than a side inlet ported engine. While this allows similar top end torque performance, the longer event demands that to solve one of the dilution problems, the inlet port must be located with respect to the exhaust port to give either a large port overlap or severe spitback. This fact alone is one of the principal considerations why available commercial rotary engines are not of the peripheral type but rather of the side inlet port induction type. But it is important to point out that while the side inlet ported engine may have low port overlap without severe spitback, its low inlet gas velocities will result in reduced low end engine torque, poor fuel economy and higher unburned hydrocarbon emissions. Accordingly, a superior rotary engine will result if the problems referred to above can be solved with respect to a high velocity peripheral ported rotary engine.

SUMMARY OF THE INVENTION

A primary object of this invention is to provide an intake and exhaust system for a rotary internal combustion engine which is effective to eliminate exhaust gas dilution and/or substantially reduce the flowback problem associated with all ported rotary engines, but particularly a peripherally ported rotary engine.

An equally important object is to provide an intake and exhaust system for a peripherally ported rotary engine which not only substantially reduces port overlap and spitback by use of a unique flow control but also substantially reduces interchamber dilution. A feature pursuant to this object is the use of a converging cluster of wing reed valves in the inlet port, the cluster having one portion acting as a labyrinth seal which mates with apex seal traversing the inlet port; the seal operates to disect the inlet port into a large number of smaller ports aligned along the direction of rotation of the seal which results in considerably less or no leakage between chambers.

Another object of this invention is to provide a peripherally ported rotary internal combustion engine having an inlet induction system that is sized and located to obtain increased combustion efficiency which in turn provides much better road load fuel economy, higher low end torque, and lower unburned hydrocarbon emissions.

Still another object of this invention in conformity with the above objects is to provide an induction system for a rotary internal combustion engine which can be utilized with conventional carburetors, is capable of producing an improved idle rating, can utilize increased port areas for larger displacement engines, and results in a lighter, shorter engine with a less complex housing construction.

Yet still another object of this invention is to provide a reed valve assembly for use in the induction system of a rotary engine and which results in a new principle of operation.

Specific structural features pursuant to the above objects, comprise (a) the use of a wing-reed valve disposed in the inlet manifold entrance port which is of a configuration effective to be instantaneously responsive to back-flow for totally eliminating the same and to be theoretically unrestrictive to inlet flow, (b) the placement of the reed valve at a location on the circumference of the epitrochoid surface where the differential pressure between variable volume combustion chambers is theoretically zero, (c) the construction of a reed valve which provides a labyrinth of surfaces constituting an extension of the inlet port periphery thereby offering a disected inlet port, (d) the use of a multi-staged carburetor in the induction system to increase induction velocity, and (e) the use of a hot and cold air induction system whereby, after engine warm up, a reduced quantity of hot air will be directed to the induction system from the exhaust area by modulating a flapper valve to control inlet air temperature.

SUMMARY OF THE DRAWINGS

In FIGS. 12–17, the indicia located and identified below FIGS. 14 is used throughout said figures to designate the presence of exhaust gas, dilution gas and intake gas respectively.

DETAILED DESCRIPTION

As indicated earlier, four problems must be solved simultaneously, namely: the need for high velocity induction, intake dilution (spitback), and the two aspects of exhaust gas dilution, that which occurs between adjacent variable volume combustion chambers (interchamber communication) and that which occurs back into the inlet port in advance of primary induction into a specific variable volume combustion chamber (port overlap). These problems have not been simultaneously solved by the prior art, and in most cases not solved singly. For example, a remote throttle at the mouth of the inlet port has been utilized by one prior art attempt to control exhaust gas dilution; unfortunately such throttle only affected adjacent combustion chamber dilution during idling. At idle speeds, the remote throttle was effective to control the amount of vacuum or suction occurring through the inlet port thereby minimizing the amount of back pressure that may occur therein. At speeds above idle, the remote throttle opened and no longer was able to control exhaust gas dilution occurring back into the inlet port. More importantly, at speeds above idle, interchamber communication was not controlled by such remote throttle. Accordingly, this design approach of the prior art is considered completely unsatisfactory for passenger car standards.

In another example, the prior art has attempted to advance the thinking of the remote throttle one step further, to a remote choke located in the inlet zone particularly suited to a peripheral ported engine. Such prior art step has utilized a torsionally restrained valve plate which would yield upon suction pressure from the combustion chamber to allow the inflow of an air/fuel mixture, but would begin to return to a closed or choked condition when the suction was non-existent. Such construction never proved to be entirely successful because the response time of the torsionally restrained valve is too slow to satisfactorily eliminate exhaust gas dilution and spitback or to improve flow velocity.

Independent from rotary engine art, flutter valves have been used to permit gaseous flow in one direction and prevent differential back-flow. These valves are deficient for achieving the results of this invention because they (a) lack adequate and rapid response to a differential back-flow pressure, (b) lack minimal residual back-flow volume within a closed valve, (c) lack proper design for obtaining high velocities through the valve assembly, and (d) lack a labyrinth seal at the exit of the valve assembly which does not offer a detrimental pressure drop therethrough.

Figure 1:
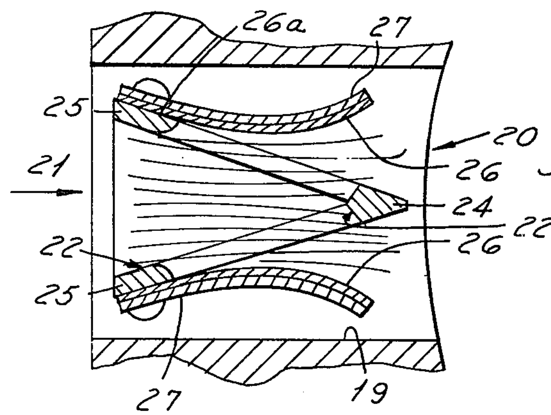
FIGS. 1 and 2 illustrate diagrammatically the function and construction of one type of reed valve having operating deficiencies.
Figure 2:
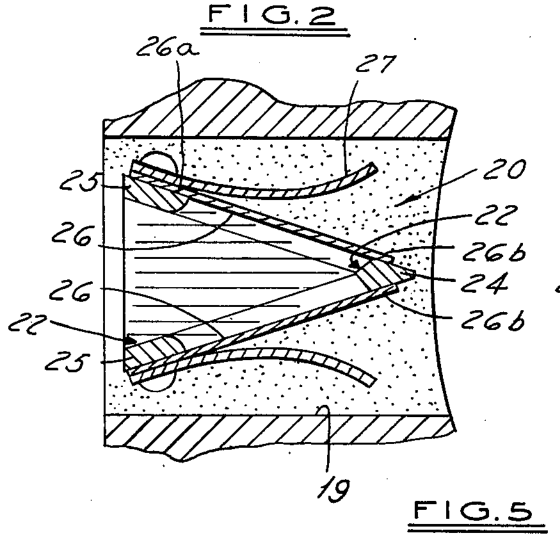

A phase of improvement will result by interposition of an instantaneously responsive wing-type reed valve assembly in a peripheral ported engine, the assembly being designed to span the entire cross sectional area of an inlet port for the rotary engine. An instantaneously responsive wing-reed valve, for purposes of this invention, differs from a conventional reed valve as shown in FIGS. 1 and 2; it has reeds 26 that allow flow in one direction 21 when a differential pressure exists across the valve throat opening 22 (defined as spacings between ribs of a seat structure 24 allowing flow to enter at its base 25 and exit through the openings) causing the reeds 26 to flex open as in FIG. 1. The reeds 26 are bendable leaf-like strips of metal secured at one end **26*a* and have the other end 26*b* free to move in response to pressure. A rigid back-stop plate 27 is fastened in common with the reeds 26, but remains fixed in configuration as shown. The reeds 26 move outward away from the structure 24 to abut plates 27 when the valve is opened. When the differential pressure is reversed, so that a high pressure shown by the dotted area (back-flow dilution) is downstream of the valve, then the reeds 26 close on their seats to stop back-flow. If the assembly 20 were mounted within a conventional intake port 19 of a rotary engine housing, within the knowledge of art, the leading and trailing edges of the assembly would have to be non-aligned with the entrance and exit of the port 19. The response time of this valve is not sufficiently rapid to perform properly in controlling the gases in an induction system for a rotary engine. This is evident from the large amplitude of the reed tips 26*b* in moving between closed and open positions. A rotary engine demands that the valve assembly cycle at least 120 times/second to correlate with the action of the rotor. The valve of FIGS. 1 and 2** would choke flow in a rotary engine.

Undesirable residual back-flow volume can be measured; this is represented in FIG. 2 by the dotted area. For the type of construction shown, the volume can be considered to be in excess of 10.0 cubic inches. The straight large bore of the inlet port prohibits high velocities therethrough.

Figure 3:
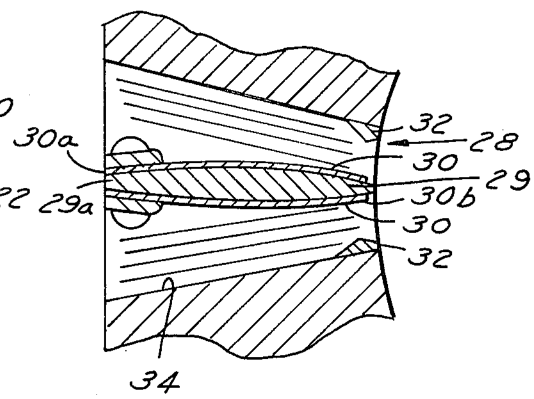
FIGS. 3 and 4 illustrate diagrammatically the function and construction of one type of wing reed valve assembly embodying certain principles of this invention.
Figure 4:
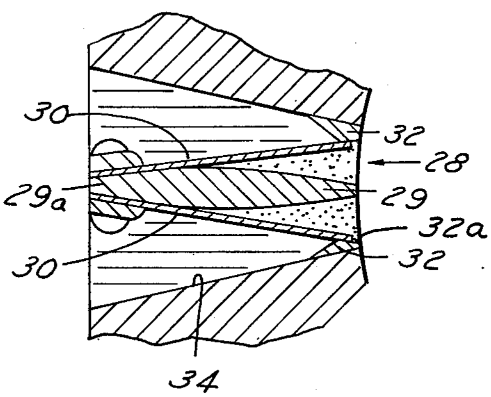

To increase flow velocity, lower residual back-flow, and improve the response time of the valve without creating an undo restriction to flow therethrough during the open condition, the wing-reed assembly 28 of FIGS. 3–4 was constructed. The assembly 28 has a rigid back-stop or rest 29 which is shaped as an air foil or wing; when several of these air foil assemblies are used, the amplitude of the reeds can be decidedly reduced and high velocity induced by a converging cluster of these valves. Two reeds 30, one on opposite sides of the rest 29, are mounted at one end **30*a* to the base 29*a* of the rest. In the open position of FIG. 3, the flow 31 is split and proceeds in a streamlined manner about the outwardly facing foil-contoured sides of the reeds. The reed valves have a margin extending beyond or cutaway from the stop; this permits substantially better response to a differential back-flow pressure. In the closed position, the reeds 30 tend to return to a flat condition with their free ends 30*b* in contact with stops 32 having a surface 32*a* aligned to make a surface-to-surface seal with a margin on the end of the reed 30. The leading and trailing edges of the reeds and of the assembly are aligned with the entrance and exit of the intake port 34,** a feature of this invention which shall be described more fully.

Figure 5:
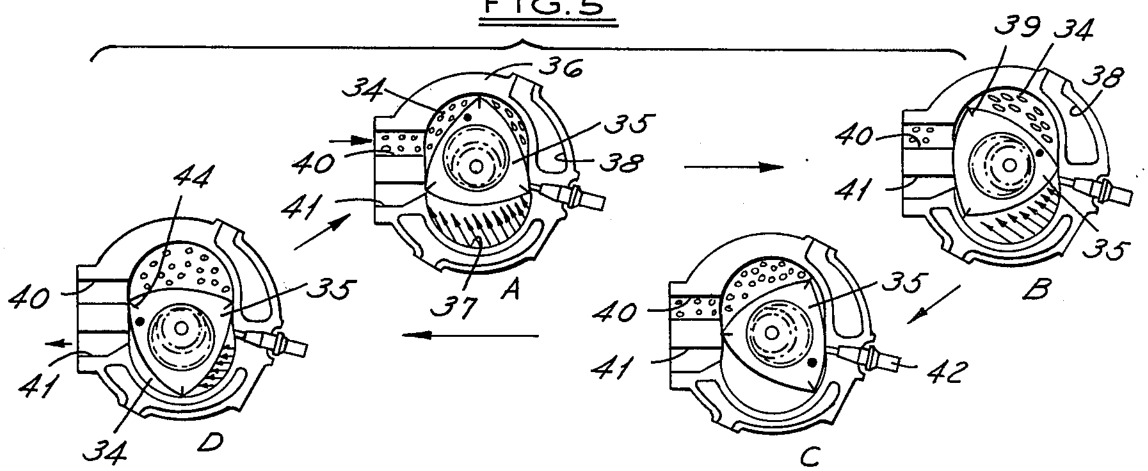
FIG. 5 is a composite of schematic illustrations of a typical prior art rotary engine illustrating various stages of operation of engine particularly with reference to the induction system.

Some brief mention should be made of the conventional mode of operation of the intake-exhaust system for a peripherally ported rotary engine according to the knowledge of the prior art. In FIG. 5, the four cycle sequence is illustrated with respect to particularly one variable volume chamber 34 defined between the rotor 35 and the walls of the housing 36. The schematic illustrations show the housing broken away to reveal the epitrochoid wall 37 and water cooling channels 38. The chamber 34 (adjacent the black dot on the rotor and which should be followed for the subsequent cycles) undergoes suction during the intake cycle A thereby drawing in a combustible mixture through port 40; note that the apex seal at 39 is bisecting the exhaust port 41 which permits interchamber communication. As the chamber 34 proceeds to the compression cycle B, the intake port is sealed off from chamber 34 by the apex seal at 39. However, port overlap is occurring in the chamber trailing chamber 34. In the smallest volume condition of chamber 34 (see cycle C), the mixture therein is ignited by spark means 42. Finally, during the exhaust cycle D, chamber 34 is again placed in interchamber communication when apex seal 44 begins to traverse intake port 40. Note the relatively close proximity of the intake and exhaust ports and the absence of control apparatus for the intake-exhaust system.

Figure 6:
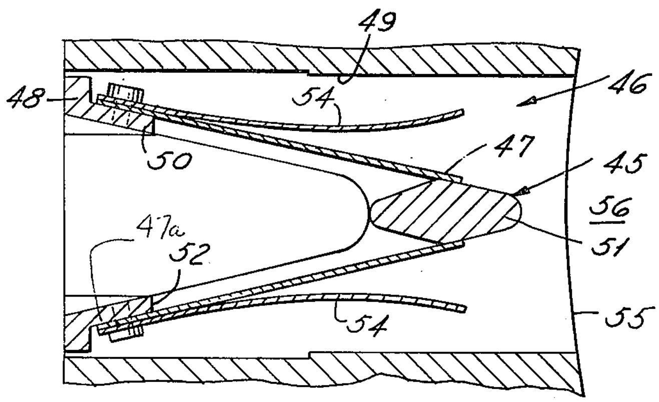
FIG. 6 is an enlarged sectional view of one type of reed valve assembly utilized in the development of this invention.
Figure 7:
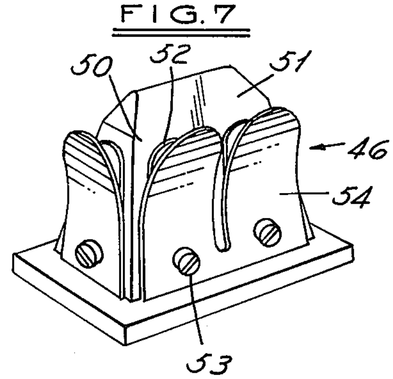
FIG. 7 is a perspective view of the reed valve assembly of FIG. 6.

An initial attempt to solve the lack of high velocity through the inlet port appeared as construction 46 in FIGS. 6 and 7. It may be commonly referred to as the pagoda design employing reed valves at the ends as well as sides of a cage or tent structure 45 formed for defining the valve openings and for supporting the reeds 47. The assembly had an annular base 48 effective to extend across the entrance to port 49. The cage base was joined to a step in the inlet port and had four rectangularly related tapered walls 50 converging to a strip-like apex 51. In each of the walls, openings 52 were provided with the margins of the openings serving as reed valve seats. Two openings were located in each of the side or larger walls and one of the openings located in each end wall. The bendable reed valves 47 were fastened at one end **47*a* thereof by a suitable fastener 53. A thin leaf-type back-stop 54 was provided for each reed valve, but defined with a contour allowing the reed valve to assume a curved shape in the opened condition. The side reed valves and back-stops each were joined at a common web to facilitate assembly. In operation, suction created in chamber 56 caused a flow of inlet air to take place through the openings 52** forcing the reed valves to curve away from the valve seats. The maximum opening, with the reeds in their fully extended position, is a design parameter to render a desired flow. In order to provide an equivalent flow to that of this invention, to be described, the pagoda design must be unusually large and therefore is unacceptable for rotary engine utilization. The amplitude of each reed valve is unduly large causing response time to be poor. The pagoda design offers little improvement in residual back-flow volume and reduction of interchamber dilution.

Figure 13:
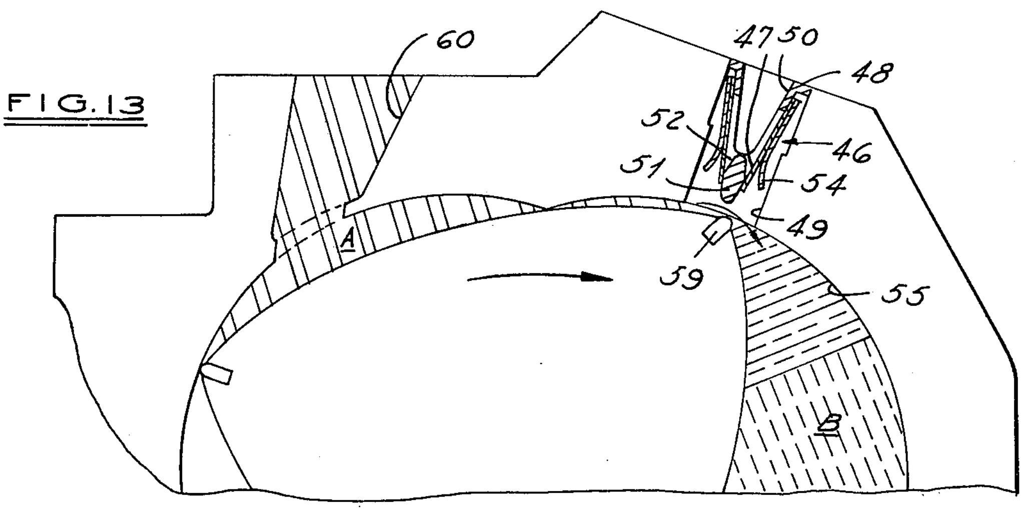

The pagoda construction was tried in various port locations. First the valve assembly 46 and port 49 were located as in conventionally designed engines (see FIG. 13), at about 20° from the minor axis of the epitrochoid. The intake port cross sectional area was rectangular and about 1.89 square inches. As the apex seal 59 traverses the inlet port 49, considerable port overlap and interchamber dilution occurs whereby exhaust gases will transfer directly from chamber A to chamber B and indirectly around the apex seal 59 because there is no effective sealing to prevent communication during this period of movement. Higher pressure exhaust gas will flow from A to B since the intake cycle has not proceeded sufficiently far to generate a high differential pressure.

Figure 12:
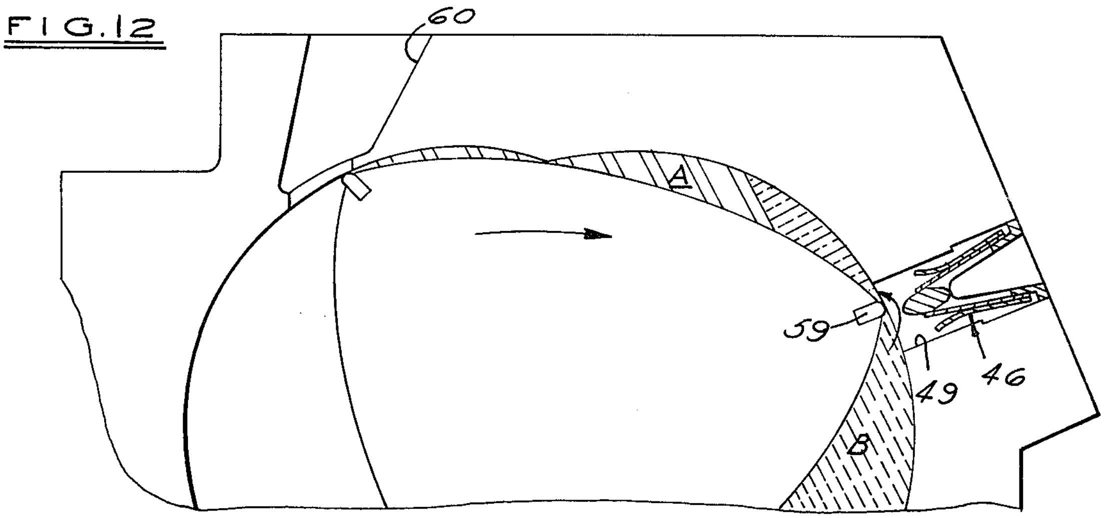
FIGS. 12 and 13 illustrate diagrammatically the effect of dilution with respect to location of the intake port at different peripheral locations of the epitrochoid wall utilizing an assembly early in the development of this invention.

An attempt to locate the inlet port 49 at a distance sufficiently far away from the exhaust port 60 (see FIG. 12), so as hopefully to eliminate port overlap, still permits interchamber dilution to occur and reduces the time event for inducting the mixture before ignition. Interchamber dilution occurs when seal 59 traverses port 49, but for a lesser degree of crank angle movement. The late intake event produces poor engine power. Spitback is considerably present with such a late intake event; the reed valve construction tends to reduce this problem, but the large amplitude and lower frequency of operation of the reed valve construction still permits undesirable but limited spitback.

Figure 8:
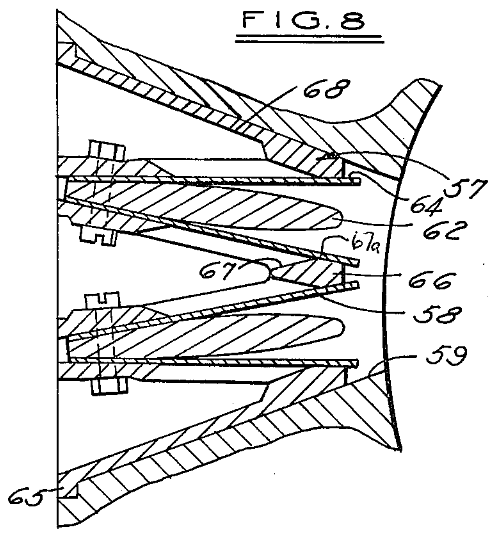
FIG. 8 is an enlarged sectional view of one principle mode of this invention.
Figure 9:
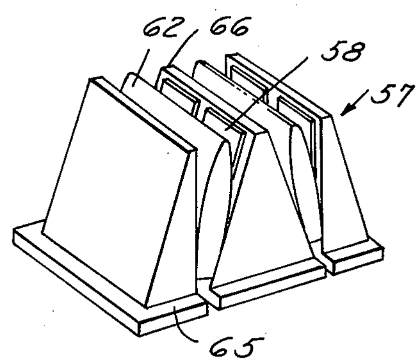
FIG. 9 is a perspective view of the reed valve assembly of FIG. 8.

Turning now to FIGS. 8 and 9, a first mode of this invention is disclosed. This mode particularly is effective to totally eliminate the spitback problem by providing a reed valve assembly which is substantially instantaneously responsive. The port overlap problem has been substantially reduced without substantial sacrifice of engine power by a unique combination of port sizing, port location and valve responsiveness. The engine power problem is overcome by use of an induction system which attains high velocity characteristics even through a reed valve assembly; a unique converging cluster forming the reed valve design is effective to substantially reduce residual back-flow dilution resulting from gases accumulated within the assembly.

As shown in FIGS. 8–9, the reed valve assembly comprises a cage 57 which has a number of tent-like structures 66 between which wing-foil-type stops 62 and bendable reed valves 58 are secured. Each tent-like structure 66 has openings 67 through sides thereof; the margins **67*a* of said openings 67 constitute a valve seat. The bendable reed valves normally lay flatly across said margins for closing an opening 67. Under the influence of a high pressure differential from inducted gases, the reed valves are forced to bend as a cantilever beam and come to rest against stops 62;** each stop has one or more surfaces with a curvature substantially equivalent to the curvature of the wing-reed valve as a cantilever beam when uniformally loaded.

Although the assembly in FIGS. 8 and 9 is shown to have a plurality of eight reed valves, a more effective construction would employ approximately 12 or more of such valves. With the latter design in mind, instantaneous responsiveness of the assembly is achieved by arranging each reed valve to have an amplitude (lift per reed measured at the top thereof) no greater than 0.1 inch Each reed valve has a width of about 0.7 inch and a thickness of about 0.008 inch. The reed valves may be constructed of 301 stainless steel for suitable responsiveness. The area of each reed exposed to inducted air through openings 67 is approximately 0.13 square inches per reed. Most critically, each reed valve has a margin 64 which extends beyond the stop 62 in the fully opened condition so that reverse flow (or a higher differential back-flow) is effective to engage said margin or small area on the backside of each reed for promoting a quick return of the reed valve to its closed condition. In this particular embodiment, the area of the reed valve exposed to back pressure is designed to be about 0.12 square inches per reed.

Figure 15:
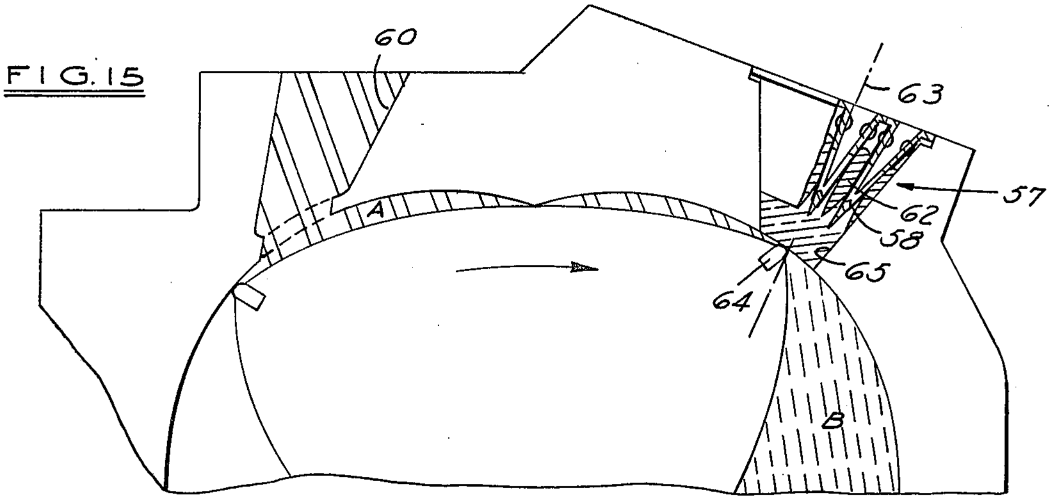

In order that port overlap dilution may be reduced, the location of the inlet port and its size is adjusted. The inlet port is located at the theoretical point where the pressures in two adjacent chambers (A and B) are equal (see FIG. 15). To properly locate the center line 63 of the port, the exhaust system back pressures are plotted against throttle opening. As the back pressure increases, pressure in chamber A, open to the exhaust port, will change; the adjacent chamber B is simultaneously starting on the compression stroke. As the throttle is opened, pressure in chamber B increases. The location for the center line of the inlet port is selected as the point where the pressures in the two chambers are equal at the maximum torque peak of the engine. Port overlap will be reduced and is experienced for less than 123° of eccentric shaft movement. During movement of the apex seal past the mid-portion of the port, there is little or no differential pressure between adjacent chambers and there will be little or no dilution flow in either direction. Thus, even though the intake and exhaust ports are in communication, the degree of exhaust gas dilution is reduced in inverse proportion to the distance from the center line of the port.

Additionally, the inlet port 65 is provided with a rectangular converging configuration whereby the sides of the port make an angle with the center line thereof of at least 20°. This facilitates high velocity flow through the intricate valve assembly. Each of the tent-like structures of the cage are arranged in a cluster to accommodate the converging port; the structures and stops occupy substantially the entire cross sectional area of the port leaving little space for back-flow dilution to reside when the reed valves are closed. As an example, the outlet side of the intake port may be provided with an area of approximately 1.89 square inches for the embodiment shown in FIGS. 8 and 9.

The intake event for drawing in the combustible mixture is relatively prolonged therefore insuring optimum power characteristics at low end torque. For example, the intake port timing event for the structure, as shown in FIGS. 8 and 9, when related to the rotary movement of the eccentric shaft, has an intake origination at 75° before top center and an intake completion at 60° after bottom center. The exhaust event was arranged so that it was originated at 75° after bottom center and complete at 51° after top center. These relatively long intake and exhaust events promote good engine power. When coupled with the high velocity characteristics of the system and peripheral arrangement, a highly efficient engine operation is promoted. The velocity of flow during the intake event can best be visualized by noting that flow rates of 125 c.f.m. are attained.

Figure 10:
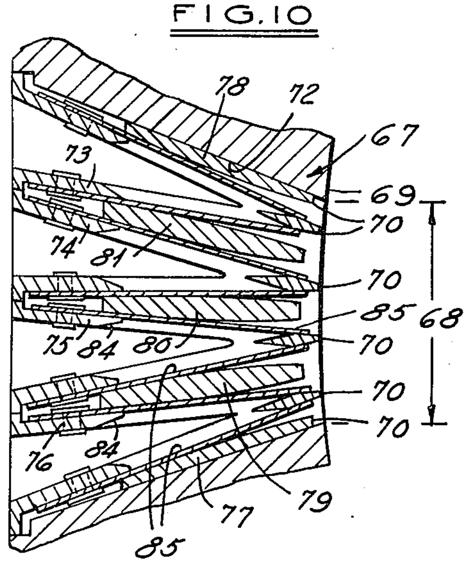
FIG. 10 is an enlarged section view of another type of intake port and advanced reed valve assembly embodying the preferred mode of this invention.
Figure 11:
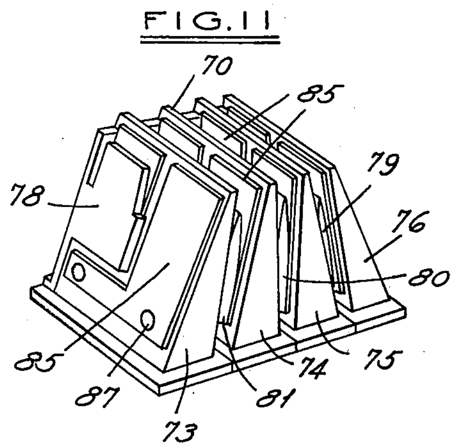
FIG. 11 is a perspective view of reed valve assembly of FIG. 10.
Figure 14:
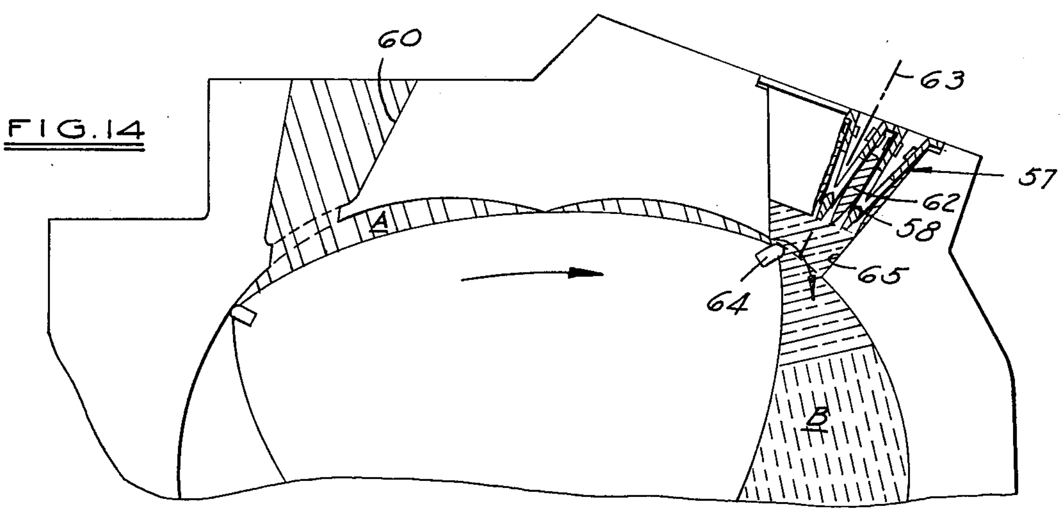
FIGS. 14, 15 and 16 illustrate diagrammatically the dilution effect of the reed valve assembly of FIG. 8, the center line of the intake port being located at substantially zero differential epitrochoid chamber pressure, the rotor being shown in various positions.
Figure 14:
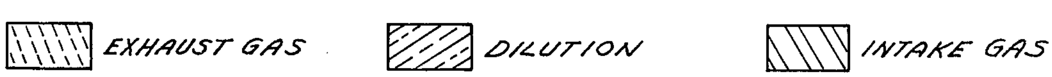
Figure 16:
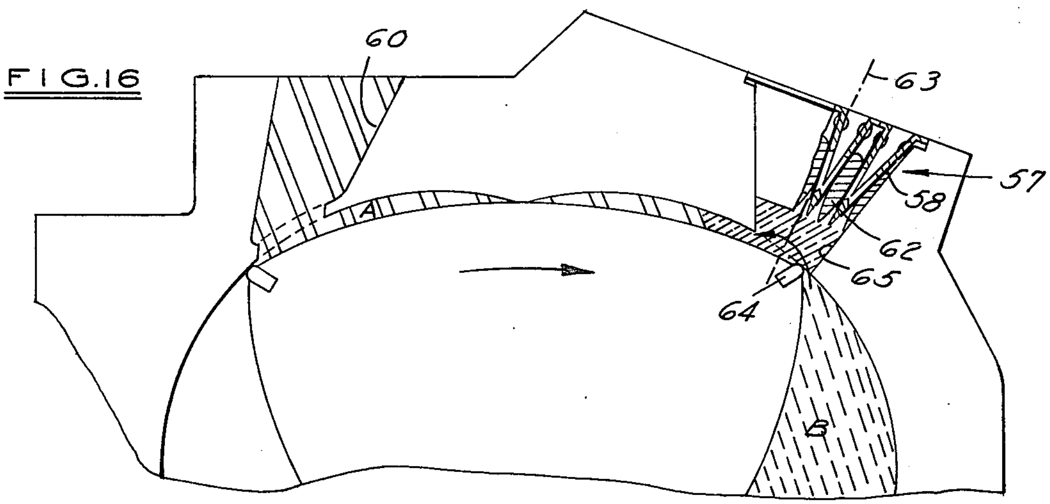
Figure 17:
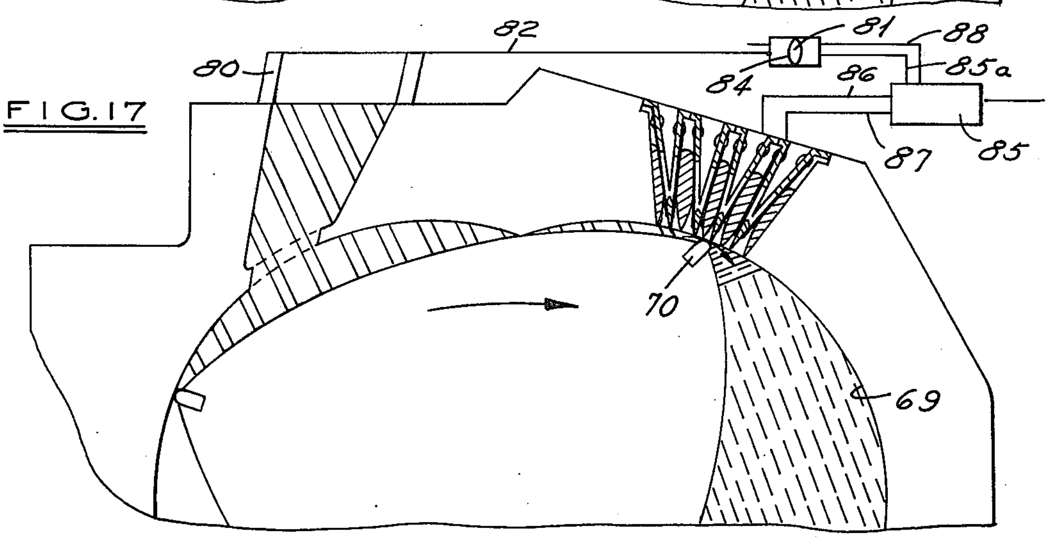
FIG. 17 is a diagrammatic view of a rotor housing and piston showing the preferred mode of induction system and having the preferred mode of reed valve assembly.

One of the significant problems outlined earlier, still remains for the construction of FIGS. 8 and 9. This is interchamber dilution which prevents such construction from meeting all the goals of the present invention. The preferred mode as illustrated in FIGS. 10 and 11 (and particularly FIG. 17) overcomes this aspect while retaining the virtues of the first mode. To illustrate the problem of interchamber dilution, attention is directed to FIGS. 14, 15 and 16. Since the inlet port has some width (although varied from the prior art) the pressure in the two adjacent chambers A and B will not be equal during the entire time the apex seal is traversing the inlet port. The total crank angle during which the apex seal will traverse the inlet port, for the illustrated embodiment is approximately 28°. During some portion of this crank angle, some port overlap and some interchamber dilution will occur. As shown in FIG. 14, as the seal starts to pass over the port, there is some tendency for exhaust gases to flow from chamber A to chamber B. However, this will endure for less than 14° of crank angle. At the exact center of the inlet port, there will be no flow from either chamber since the center line of the inlet port is located at the theoretical point of zero differential pressure (see FIG. 15). As the apex seal passes over the latter half of the inlet port (see FIG. 16) a mixture of exhaust gas, fuel and air will flow from chamber B to chamber A, but again only for less than 14° of crank angle. Nonetheless interchamber dilution remains as an unsolved problem for the first mode.

To remedy this, the preferred embodiment of FIGS. 10 and 11 utilizes a wing-reed valve assembly 67 having at least 16 reed valves located in a decidedly converging cluster; the tips or terminating portions 70 of the cage structure located almost exactly on the counter of the trochoid surface 69 of the engine. In effect, the terminating portions become an extension of the trochoid wall 69 and can be considered a labyrinth seal cooperating with the apex seal 90 which brushes there across. The tent-like structures, stops and cage together define independent passages which the apex seal successively aligns with. The inlet port 72 is accordingly subdivided into a number of small inlet passages which reduce any interchamber communication to a fraction at any one moment of the total inlet port area. Interchanger dilution is accordingly dramatically reduced and can be considered a nil problem. Since interchamber dilution and port overlap dilution is almost eliminated, the inlet port area has been increased both at the inlet side of the port as well as the outlet side of the port which also facilitates the combination of the larger number of reed valves for improved high velocity flow.

The cage 66 is provided with at least four tent-shaped structures (73, 74, 75 and 76). Three double-acting air foil stops (79, 80 and 81) are interposed respectively between the structures (76, 75, 74 and 73); two single-acting air foil stops 77 and 78 are exposed at the extreme sides of the port. Again the reed valves are arranged to lie normally flat across to close the openings 84 in the cage, each opening being arranged to reside at an angle with respect to the center line of the port depending on the spacing of the tent-like structure with respect to the center line thereof; the closer the opening to the center line, the more it tends to become parallel therewith. Each reed valve 85 is cantilevered by being fastened at 87 and has a thickness and width substantially as that in the first mode described. The area of the reed exposed to back pressure is still about 0.12 square inches per reed and the reed valves extend slightly beyond the air foil stops in the opened condition for promotion of the instantaneous responsiveness to back-flow pressure. The curvature of the stop may preferably have a 13 inch radius and dimension along the center line of approximately 1.7 inches. The intake port has an outlet side 68 with an area of approximately 2.52 square inches; the eccentric shaft moves only 85° during any overlap that may occur between the exhaust and intake ports. The intake port event was modified slightly for this embodiment and has an intake origination occurring at 34° BTC and intake completion at 95°

ABC; for the exhaust port, the event has exhaust origination at about 78° BBC and an EC of approximately 51° ATC. Most importantly, the residual exhaust gas dilution volume, which can reside within the valve, has been reduced below 1 cubic inch.

As a result of the sequential development of this invention from the first mode to the preferred mode, the following design standards have become crystallized with respect to achieving the goals of this invention. The intake port size should have at least 1 square inch of intake port area for each 42 cubic inches of displacement of the engine. Port overlap should exist for no greater than 85°. The amplitude of each reed valve should be no greater than 0.1 inch and there should be at least one reed for each 6.8 cubic inches of displacement for the engine. The port should be designed with a converging configuration whereby the sides thereof form an angle of at least 20° with the center line. The area of the reed exposed to back pressure should be no less than 0.12 square inches per reed and the area per reed which is exposed to air inlet pressure should be no less than 0.13 square inches per reed. The cage structure can be constructed of either aluminum (of die-cast quality) or plastic that is thermally stable up to 350°F. The reed material should be of 301 stainless steel or an equivalent. The reed valve assembly must have a cage structure with terminating portions disposed between 0.0005 inches to 0.001 inches below the surface of the trochoid curvature (to prevent interference of the apex seal) but substantially to form a labyrinth seal as the apex seal brushes there across. The intake and exhaust event should be approximately IO 34° BTC — IC 95° ABC; EO 78° BBC — EC 51° ATC.

An engine equipped with the embodiment of FIGS. 10 and 11 will have excellent idle characteristics (such as a rating of 7+), excellent low end torque and road load fuel economy; engine power losses will be minimized with increased back pressure. An analysis of the steady state emissions resulting from the use of an engine equipped with the preferred embodiment of this invention will have significantly lower $NO_x$. For larger displacement engines, the port area can be increased in size and in fact can be unlimited in a true design sense. The oil consumption is reduced since peripheral port engines of both the side seals and oil seals are working to separate the converse chamber effectively from the crank shaft area, whereas in a side ported engine, the side ported engine, at certain moments of movement, overlaps the side seals to dissipate their normal function. The engine is lighter and shorter.

The preferred embodiment of this invention uses a peripheral inlet port induction system (with the dilution problem solved) that is sized and located to obtain high velocities in the induction system. The high velocity inlet port increases induction turbulence, which results in increased flame speed at the start of combustion. This increased combustion efficiency results in superior road load fuel economy, higher low end torque, and lower unburned hydrocarbon emissions. However, in a two rotor rotary engine, the phasing between the rotors results in rotor timing that requires an unbalanced induction system to retain these virtues. This is not too different from a current V-8 engine which requires four cylinders to be charged from one side of a 2-V or 4-V carburetor and the other four cylinders to be charged by the other side of the carburetor, The rotary engine, being a higher speed engine than most V-8 passenger car engines (6,000 versus 4,600 r.p.m.) requires a higher quantity of air at higher speeds. In conformity with this invention, a large capacity carburetor is needed. If a two barrel carburetor is used, the velocities through the venturies at low engine speeds would be too low to give a sufficient metering signal. If a small two barrel carburetor is used, the high speed end is too restrictive. Furthermore, a plenum type manifold will reduce the carburetor size requirement but will reduce low end torque to unacceptable levels. Therefore, this invention requires two staged carburetors in combination with the intake system. An unbalanced four-barrel carburetor is two staged carburetors. A two-barrel variable venturi carburetor is also useful having adequate air flow capacity to accomplish the same function as four-barrel carburetor. This invention comprehends a sonic carburetor of the variable venturi type to be within the requirement of two staged carburetors and would be particularly useful with the manifold system in FIG. 17.

With the two staged carburetors, a four runner intake manifold would be desirable; a primary and a secondary runner would be attached to each rotor housing. The carburetor staging allows a small area primary runner and a large area secondary runner to be used. The small area primary runners connect the primary passages of the carburetor to each rotor housing while the large area secondary runners connect the secondary passages of the carburetor also to each rotor housing. This allows high velocities to pass the primary venturies for a strong metering signal and also allows sufficient heat to be added to the runners to completely vaporize the fuel without restricting the high speed air flow. The high velocity vaporized mixture allows leaner air/fuel mixtures at road load, which results in increased fuel economy and improved drivability. At wide open throttle accelerations or at speeds above 75 m.p.h. road load, the secondary throttles will open to give maximum air flow to the engine. The carburetor should have a design capacity of about 2.6 cubic feet/-minute for each cubic inch of displacement for the engine per rotor. Preferably, the throttle of the primary and secondary runners should have a diameter of about 0.825 inches and the venturi size should have a diameter of about 0.770 inches.

Reciprocating engines currently use a hot and cold air cleaner system to improve engine warm-up time for better drivability with lean choke setting. The preferred embodiment of this invention utilizes this pinciple in a different and improved manner. The heat concentration in a rotary engine-exhaust manifold is many times greater than a reciprocating engine exhaust manifold because of (a) higher exhaust temperature due to one exhaust port for three combustion chambers and in a two rotor engine, the exhaust ports are close together, and (b) the compactness of the manifold. To take advantage of this increased heat, a sheet metal shroud 80 (see FIG. 17) surrounds the exhaust manifold to form a hot-air stove; the stove is connected to a snorkel 81 by a sheet metal duct 82. A flapper valve 84 is contained in the snorkel to control hot air therethrough in response to a temperature sensitive device. When the engine is cold, the flapper valve opens the passageway 82 from stove 80 to the inlet 85*a* of two-stage carburetor 85 (having primary runner 86 and secondary runner 87) and closes the passageway 88 from the normal outside air entrance to the carburetor. This allows heated air to enter the carburetor 85. Hot air eliminates carburetor icing and helps vaporize the fuel. After engine warm-up, a reduced quantity of hot air will be directed to the induction system by modulating the flapper valve 84 to control inlet air temperature. The system is effective to obtain a carburetor air temperature of 75° ± 5°F after 4 minutes of warm-up and reach 105°F ± 5°F after 8 minutes at 30 m.p.h. at 0°F ambient air temperature.

In certain engines where an unusually low level of $NO_x$ emissions content of 2.0 grams or less per vehicle mile for the engine is mandated, a predetermined spacing may be intentionally provided between the reed valve assembly and trochoid surface to equivocate a regulated amount of internal exhaust gas recirculation.

Two advantages, not previously mentioned, accrue from the use of the induction exhaust system herein. The noise level of the system is reduced over prior art systems. The back pressure of the system is lower even though a one-way means is used to control the intake port; the lower back pressure provides better fuel economy. Back pressures as low as 5 inches of mercury at 4,000 r.p.m. can be obtained. Back pressures of commercially available prior art engines will be 15 inches of mercury at 4,000 r.p.m. and as much as 28 inches of mercury at 6,000 r.p.m. for a two pass reactor exhaust system.

I claim as my invention:

1. In a rotary internal combustion engine having variable volume combustion chambers defined by a rotary piston dynamically sealed against a surrounding housing at spaced locations of the rotor, said engine having means for igniting a combustible mixture introduced at one location to each of said chambers and for peripherally exhausting the combustion gas from said chambers, an induction system for said engine, comprising:

a. a housing having a trochoidally shaped wall with an inlet port in said wall at said one location for admitting a combustible mixture into said chambers, said port having a centerline located at a station of said wall wherein the differential pressure between adjacent chambers will be consistently at about 0, said port having a throat area equal to or less than 1.0 square inch for each 42 cubic inches of engine displacement whereby induction flow velocity is induced at a high level, and b. means effective to permit flow of said combustible mixture through said port while limiting dilution backflow to less than 2 cubic inches per cycle of said engine, said means being actuated to open or close by a change in direction of greatest fluid pressure forces in said inlet port, said means having a frequency response of at least 120 cycles/second.

2. In a rotary internal combustion engine having variable volume combustion chambers defined by a rotary piston dynamically sealed against a surrounding housing at spaced apices of the rotor, said rotor being turned with planetary movement by an eccentric shaft, said engine having means for igniting a combustible mixture introduced at one location to each of said chambers passing said location, an induction and exhaust system for said engine comprising:

a. housing means having a trochoidally shaped peripheral wall, b. means defining at least one inlet port and at least one outlet port in said peripheral wall, each having a centerline generally directed normal to said wall at the intersection therewith, at least said inlet port having a narrow throat area no greater than 1 square inch for each 42 cubic inches of engine displacement to permit a high flow velocity through said inlet and outlet ports, said inlet port being located with the centerline thereof at a station of said peripheral wall at which the differential pressure between adjacent chambers will be consistently at about 0 and said inlet port being circumferentially spaced from said outlet port so that port overlap permitted by spaced apex sealing on said rotor endures for no greater than 85° of rotary movement of said eccentric shaft, and c. one-way flow control means disposed in said inlet port effective to substantially eliminate dilution backflow through said inlet port and prevent substantial communication between chambers through said inlet port, said system providing a reduced back pressure acting against inducted flow of about 5 inches of Hg when the engine is operating at 4000 rpm.

3. The system as in claim 2, in which said flow control means comprises a wing reed valve assembly having a plurality of wedge shaped valve seats arranged in a converging cluster each having the terminal edge of said wedge shapes in parallel and having the extent of each valve from the base of each wedge through the terminal portion thereof aligned with the centerline of flow, said valves being arranged in a converging cluster for substantially reducing the residual volume of backflow dilution that may exist between the valve seat and the outlet of said inlet port.

4. The system as in claim 3, in which the amplitude of each reed valve is equal to or less than 0.1 inch, each reed valve having a stop against which said reed valve rests in the open position, said stop having a curvature equal to the cantilever curvature of said reed valve under substantially uniform loading.

5. The system as in claim 4, in which said stop engages less than the total surface of said reed valve whereby backflow pressure has access to instantaneously actuate said reed to a closed position.

6. The system as in claim 5, in which said assembly has at least 16 reed valves arranged in tandem pairs, said pairs being in generally parallel relationship but converging with respect to a center plane of said inlet port.

7. The system as in claim 2, in which said flow control means comprises a wing reed valve assembly spaced a predetermined distance from the trochoid wall to regulate a desired amount of exhaust gas dilution constituting recirculation for purposes of lowering the $NO_x$ content of released exhaust gases.

8. The system as in claim 7 for use in a vehicle, in which the predetermined spacing is arranged to achieve a $NO_x$ content equal to or less than 2.0 grams per vehicle mile for the engine.

9. For use in a rotary engine having a peripheral trochoid wall delimiting a chamber within which a triangulated rotor planatates, a peripherally ported induction and exhaust system comprising:

a. means defining a high velocity inlet and a high velocity outlet, and b. one-way flow control means in said inlet having a frequency of response of at least 120 cycles per second, said control means disecting said inlet port into separately controlled portions, said control means having a labyrinth seal arranged to sequentially seal off each portion as said rotor passes thereacross.

10. The system as in claim 9, in which the inlet and outlet are peripherally arranged so that the inlet centerline resides substantially at zero differential pressure between opposite sides of a rotor apex at maximum torque peak of the engine.

11. For use in a peripherally ported rotary engine, a reed valve assembly for controlling the flow of a combustible mixture to a combustion chamber through one of said ports, said port having converging walls, comprising:

a. a unitary frame structure through which said flow passes, said structure having a plurality of wedge shaped portions with planar sides forming a converging cluster and having the terminal edges of said wedge shapes in parallel and having the extent from the base of each portion to the terminal edge thereof generally aligned with flow therealong each portion having side walls extending at an angle with respect to the main line of flow through said one port, each portion having at least one opening therethrough defining a valve throat, and the margin about said opening defining a valve seat, b. a plurality of flexible thin strips, one strip each fixedly secured at one side of said opening to normally close said opening in response to relief of pressure on the upstream side, and c. a plurality of stops with one stop aligned and adjacent each of said strips for supporting the strip in the fully opened condition, said stops having a curvature identical to the natural curvature of the strip in the opened condition, each stop being less than the associated full strip configuration whereby backflow pressure may have access to act on said strip, said stops being spaced from each strip in the fully closed condition to provide for an amplitude equal to or less than 0.1 inch.

12. A reed valve assembly as in claim 11, in which there are at least two openings provided in each of said portions, a thin flexible strip being arranged to control both said openings.

13. The assembly as in claim 11, in which said frame structure has a mouth for introducing flow through said assembly and said openings serve as the composite outlet of said assembly, the transverse dimensional area of said mouth being greater than the transverse dimensional area of said composite of exits.

14. In a rotary internal combustion engine having variable volume combustion chambers defined by a rotary piston dynamically sealed against a surrounding housing at spaced locations of the rotor, said engine having means for igniting a combustible mixture introduced at one location to each of said chambers and for peripherally exhausting the combustion gas from said chambers, an induction system for said engine, comprising:

a. a housing having a trochoidally shaped wall with an inlet port in said wall at said one location for admitting a combustible mixture into said chambers, said port having a centerline located at a station of said wall wherein the differential pressure between adjacent chambers will be consistently at about 0, said port having an inlet and an outlet, the outlet area being equal to or less than 1.0 square inch for each 42 cubic inches of engine displacement whereby induction flow velocity is induced at a high level, and b. means effective to permit flow of said combustible mixture through said port while limiting dilution backflow to less than 2 cubic inches per cycle of said engine, said means being actuated to open or close by a change in direction of greatest fluid pressure forces in said inlet port, said means having a frequency responsive of at least 120 cycles/-second, said means comprising a plurality of reed valves and associated valve seats, one reed valve being employed for each 6.8 cubic inches of displacement of the engine, said reed valves being arranged in parallel, and the associated valve seats converging with respect to the centerline of said port whereby the transverse cross-section of the inlet to said port is considerably greater in area than the transverse cross-section of the outlet therefrom.

* * * * *